United States Patent
Bergstrom et al.

(10) Patent No.: US 7,735,014 B2
(45) Date of Patent: Jun. 8, 2010

(54) DEVICE-DIRECTED DEFAULT LIST NAMING FOR MOBILE ELECTRONIC DEVICE

(75) Inventors: Dean W. Bergstrom, West Linn, OR (US); Kenneth J. Park, Cathlamet, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 585 days.

(21) Appl. No.: 11/650,208

(22) Filed: Jan. 5, 2007

(65) Prior Publication Data

US 2008/0168348 A1   Jul. 10, 2008

(51) Int. Cl.
G06F 15/00    (2006.01)
G06F 13/00    (2006.01)

(52) U.S. Cl. ...................... 715/758; 715/780

(58) Field of Classification Search ......... 715/763–765, 715/853–855, 758–780; 455/410, 418
See application file for complete search history.

(56) References Cited

U.S. PATENT DOCUMENTS

| | | | |
|---|---|---|---|
| 2002/0042830 A1 | 4/2002 | Bose et al. | 709/230 |
| 2002/0111991 A1* | 8/2002 | Wood et al. | 709/203 |
| 2003/0065721 A1 | 4/2003 | Roskind | 709/204 |
| 2004/0137882 A1 | 7/2004 | Forsyth | 455/414.1 |
| 2005/0108329 A1 | 5/2005 | Weaver et al. | 709/204 |
| 2006/0053225 A1 | 3/2006 | Poikselka et al. | 709/227 |
| 2006/0111135 A1 | 5/2006 | Gray et al. | 455/519 |
| 2006/0136584 A1* | 6/2006 | Decker et al. | 709/224 |
| 2006/0167991 A1 | 7/2006 | Heikes et al. | 709/204 |
| 2007/0055742 A1* | 3/2007 | Hebert et al. | 709/217 |
| 2007/0281607 A1* | 12/2007 | Bucher et al. | 455/3.06 |

FOREIGN PATENT DOCUMENTS

WO   WO03/085556   10/2003

* cited by examiner

*Primary Examiner*—Cao "Kevin" Nguyen
(74) *Attorney, Agent, or Firm*—Scot A. Reader

(57) ABSTRACT

Methods and systems for ensuring that a default contact list display name presented on a mobile electronic device is meaningful to a user of the mobile electronic device. Such a mobile electronic device in some embodiments comprises a user interface, a wireless interface and a processor wherein in response to a login to a server having a contact list a device-selected default contact list display name is presented on the user interface and wherein prior to presenting the device-selected default contact list display name the device causes a previous default contact list display name associated with the contact list to be replaced with the device-selected default contact list display name.

16 Claims, 6 Drawing Sheets

DEVICE-DIRECTED DEFAULT LIST NAMING FOR MOBILE ELECTRONIC DEVICE

BACKGROUND OF INVENTION

This invention relates to default list naming for mobile electronic devices, and more particularly to ensuring that a default contact list display name presented on a mobile electronic device is meaningful to a user of the mobile electronic device.

Many modern mobile electronic devices, such as cell phones, personal data assistants and pocket PCs, support numerous forms of communication. One such form of communication is instant messaging (IM), which allows a user of a mobile electronic device to send and receive text messages in near real-time over the Internet. To facilitate sending of text messages, a list of the user's contacts is typically stored on an IM server that is remote from the mobile electronic device. Prior to first login by the user, the IM server creates a default contact list for the user having a display name selected by the IM server or otherwise by the IM service. The server-selected default display name may vary depending on the IM service and is generally not meaningful to the user. For example, the display name is not guaranteed to be in the user's preferred language and may consist of an unintelligible string of characters. Thus, when a user logs into his or her IM account for the first time, a default contact list having a display name that is not meaningful to the user is often rendered on the mobile electronic device.

SUMMARY OF THE INVENTION

The present invention, in a basic feature, provides methods and systems for ensuring that a default contact list display name presented on a mobile electronic device is meaningful to a user of the mobile electronic device.

In one aspect, a mobile electronic device comprises a user interface, a wireless interface and a processor communicatively coupled with the user interface and the wireless interface wherein in response to a login conducted via the user interface and the wireless interface to a server having a contact list and under control of the processor a default contact list display name selected by the device is presented on the user interface and wherein prior to presenting on the user interface the default contact list display name selected by the device and under control of the processor the device causes a previous default contact list display name associated with the contact list to be replaced with the default contact list display name selected by the device. The device may further under control of the processor cause the default contact list display name selected by the device to be stored on the server in place of the previous default contact list display name. The device may further in response to a name change request received via the user interface and under control of the processor cause a default contact list display name selected by a user to be stored on the server in place of the default contact list display name selected by the device. The user interface may comprise a keypad and a display. The default contact list display name selected by the device may be selected based on a language preference. The processor may run instant messaging client software and the server may be an instant messaging server.

In some embodiments, the device determines whether to replace the previous default contact list display name with the default contact list display name selected by the device based on a login count.

In some embodiments, the device determines whether to replace the previous default contact list display name with the default contact list display name selected by the device based on a comparison of the previous default contact list display name with one or more default contact list display names previously selected by one or more users. In that way, the device can support multiple users and avoid inadvertently replacing default contact list display names selected by previous users.

In some embodiments, the device determines whether to replace the previous default contact list display name with the default contact list display name selected by the device based on patterns in the previous default contact list display name.

In some embodiments, the default contact list display name selected by the device is non-derivative of the previous default contact list display name. In other embodiments, the default contact list display name selected by the device is a language translated version of the previous default contact list display name.

In another aspect, a default contact list naming method for a mobile electronic device comprises the steps of logging-in to a server having a contact list; determining whether to replace a first default contact list display name associated with the contact list with a second default contact list display name selected by the device; and presenting on a user interface of the device one of the first and second default contact list display names.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
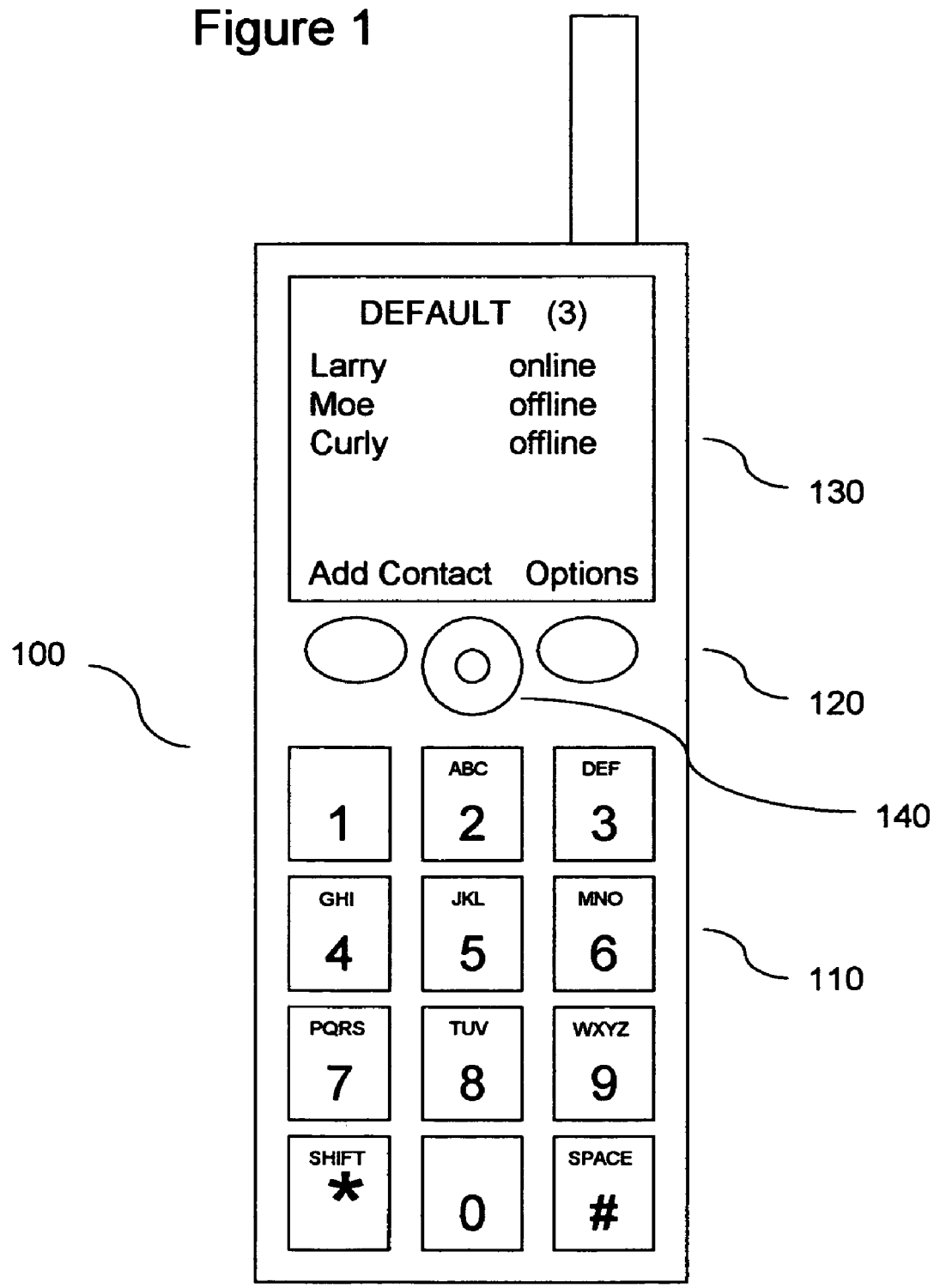
FIG. 1 shows a user interface of a mobile electronic device.

In FIG. 1, a user interface of a mobile electronic device 100 is shown in one embodiment of the invention. Device 100 is a mobile phone, such as a cellular or Internet Protocol (IP) phone. The user interface includes a keypad 110, softkeys 120, a display 130 and a touch-sensitive navigation wheel 140. Display 130 may be an LCD display. Display 130 is shown presenting a default contact list. The list includes a default contact list display name (DEFAULT), a parenthetical having a numerical indication of the number of contacts in the list (3), a listing of contacts (Larry, Moe and Curly) and presence indication (Online, Offline and Offline), respectively, for contacts. The default contact list may be, for example, an instant messaging (IM) contact list received from a remote IM server. Keypad 110 is a standard 12-key telephonic keypad that enables selection of alpha-numeric characters printed thereon. Softkeys 120 enable selection of features presently indicated at the bottom of display 130. In the present example, depressing the left one of softkeys 120 enables a user of device 100 to add a contact to the default contact list and depressing the right one of softkeys 120 enables a user of device 100 to view other options, such as changing the display name of the default contact list. A user selects a contact by manipulating wheel 140 to highlight the desired contact and pressing the button at the center of wheel 140. Naturally, in other embodiments of the invention a mobile electronic device belong to a different device class, such notebook computers, personal data assistants or a pocket PCs, and may have a different user interface. For example, a notebook computer may include a "qwerty" keyboard to receive user inputs and a mouse-type navigation tool to select contacts.

Figure 2:
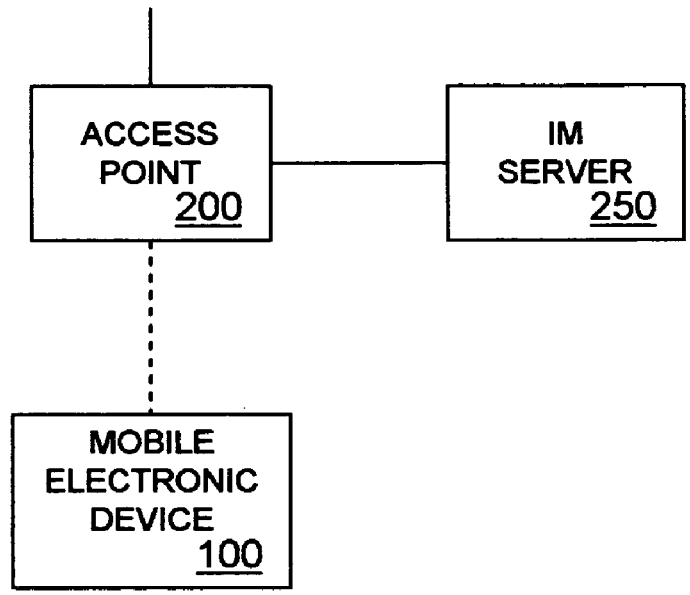
FIG. 2 shows a network.

In FIG. 2, a network in which device 100 is operative is shown in one embodiment of the invention. The network includes an IM server 250 in a network infrastructure. Server 250 may reside in an enterprise network or an Internet service provider (ISP) network, for example. Server 250 has wired connectivity with an access point 200, such as a cellular base station or a wireless LAN access point. The connectivity may be direct or via one or more intervening data communication nodes such as routers, switches and bridges. Access point 200 has wireless connectivity with mobile electronic device 100 via an over-air link. The over-air link may be any of various types of links over which data may be transmitted, such as a cellular link or a LAN link.

IM server 250 maintains IM contact lists for subscribers of an IM service and distributes upon request the IM contact lists to mobile electronic devices being used by subscribers. Each IM service subscriber has a user account with one or more IM contact lists. The IM contacts lists include a default contact list established by IM server 250 when the user account is created. The default contact list has a default contact list display name selected by IM server 250. The default contact list display name selected by IM server 250 may, depending on the IM service, not be in the subscriber's preferred language and may consist of an unintelligible string of characters.

Figure 3:
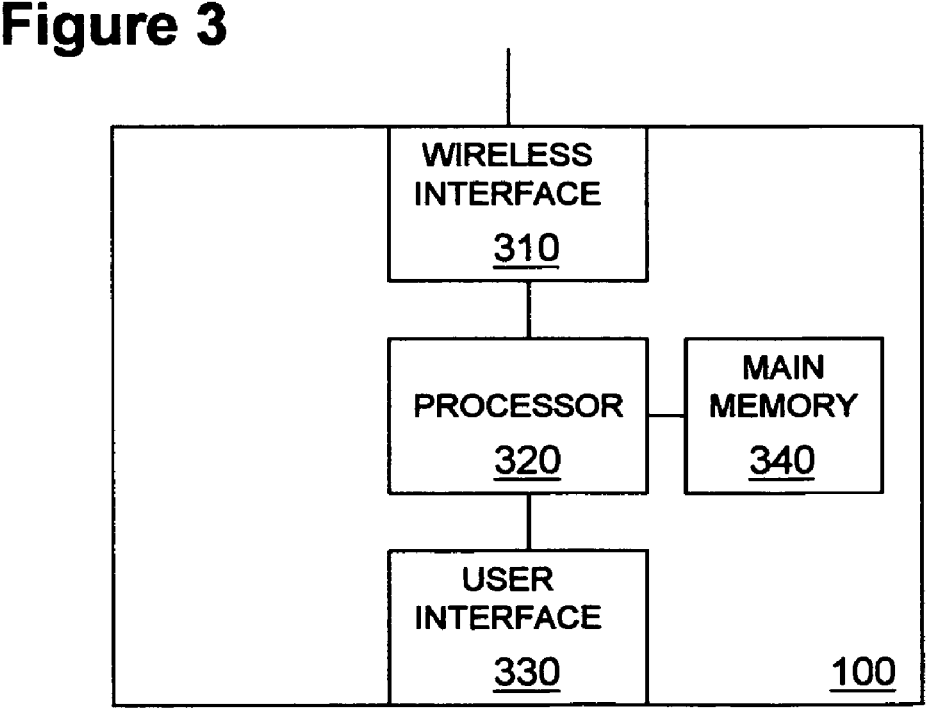
FIG. 3 shows internal logic of a mobile electronic device.

In FIG. 3, internal logic of device 100 is shown in one embodiment of the invention. Device 100 includes a wireless interface 310 adapted to transmit and receive data in accordance with a wireless communication protocol, such as a cellular or wireless LAN protocol. Device 100 further includes a user interface 330 adapted to transmit outputs and receive inputs from a user of device 100. User interface 330 elements include keypad 110, softkeys 120, display 130 and navigation wheel 140. Device 100 further includes a main memory 340 adapted to store device software and associated data. Device 100 further includes a processor 320 adapted to execute the device software stored in main memory 340 and interoperate with elements 310, 330 and 340 to perform the various features and functions supported by device 100.

Figure 4:
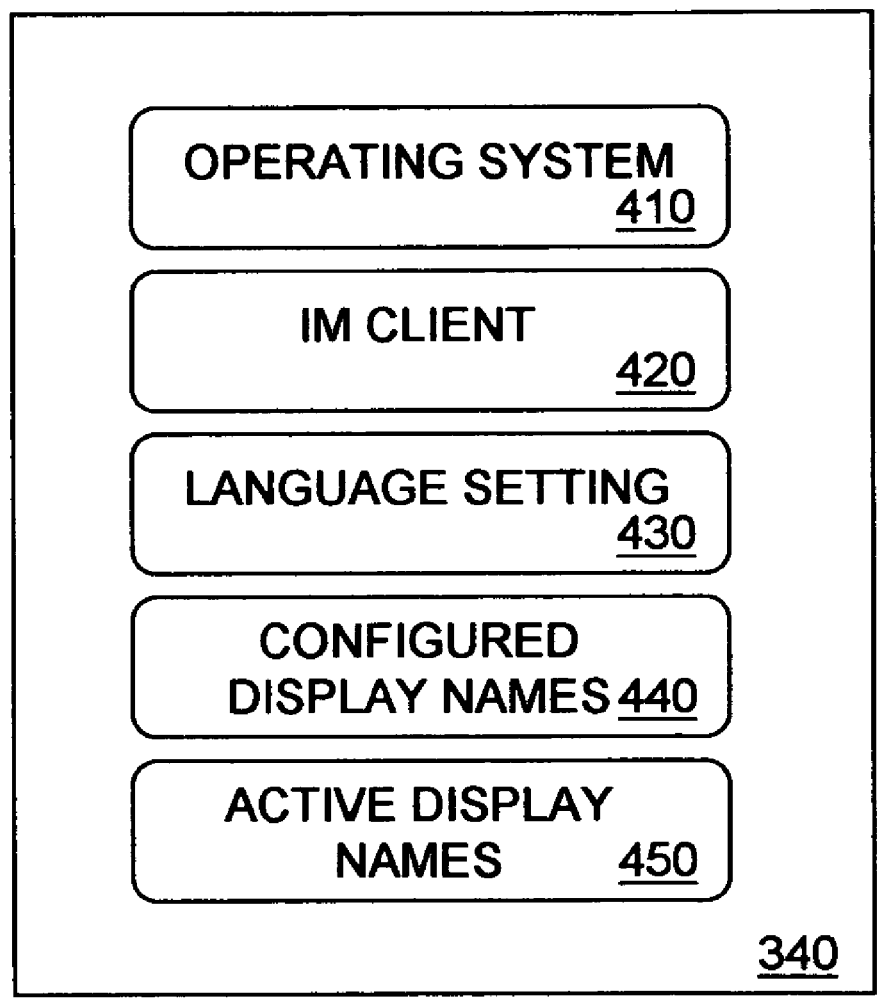
FIG. 4 shows a main memory of a mobile electronic device.

In FIG. 4, main memory 340 is shown in more detail to include certain device software, including an operating system 410, an IM client 420, a language setting 430, configured display names 440 and active display names 450. IM client 420 is a software program adapted to interwork with user interface 330, elements stored in main memory 340 and IM server 250 to support substantially real-time chat sessions between one or more users of device 200 and other users of an IM service facilitated by IM server 250. More particularly, IM client 420, running on processor 320, receives a login request on user interface 330 and transmits the login request via wireless interface 310 to IM server 250. IM server 250 validates the login request and transmits to IM client 420 via wireless interface 310 a contact list maintained for the user. IM client 420 renders the contact list on display 130. The user may then select a contact from the contact list through inputs on user interface 330 in response to which IM client 420 opens a chat session with the selected contact over wireless interface 310.

Where the contact list is a default list, the contact list display name presented on display 130 may come from different sources. In some embodiments, the default contact list display name presented on display 130 may be selected by device 100 by resorting to configured display names 440 or by user through inputs on user interface 330. In other embodiments, the default contact list display name rendered on display 130 may be a language translated version of the default contact list display name selected by server 250.

Language setting 430 is a stored language preference settable by a user of device 100 and referenced by IM client 420. A user may select through inputs on user interface 330 a preferred language from two or more supported languages. Device 100 references the preferred language stored in language setting 430 during operation and renders certain text, including configured display names 440, in the preferred language.

Configured display names 440 are stored default list display names that are preconfigured on device 100 and are referenced by IM client 420. One configured display name is stored for each supported language. Device 100 references configured display names 440 during operation and selects the configured display name that corresponds to the preferred language indicated in language setting 430.

Active display names 450 are stored default list display names that are selected by users of device 100 and are referenced by IM client 420. Active display names 450 are retained in the event device 100 has multiple users to prevent device 100 from inadvertently replacing an earlier user's selected default list display name when a later user logs-in to the IM service for the first time. More particularly, when an earlier user logs-in and changes the server-selected default contact list display name with a user-selected default contact list display name, a record of the user-selected display name is made in active display names 450. Subsequently, when a later user logs-in for the first time and receives a default contact list display name from server 250, device 100 checks the default contact list display name received from server 250 against active display names 450 to prevent inadvertent replacement of the earlier user's user-selected display name. This safeguard will be explained in even greater detail below.

Figure 5:
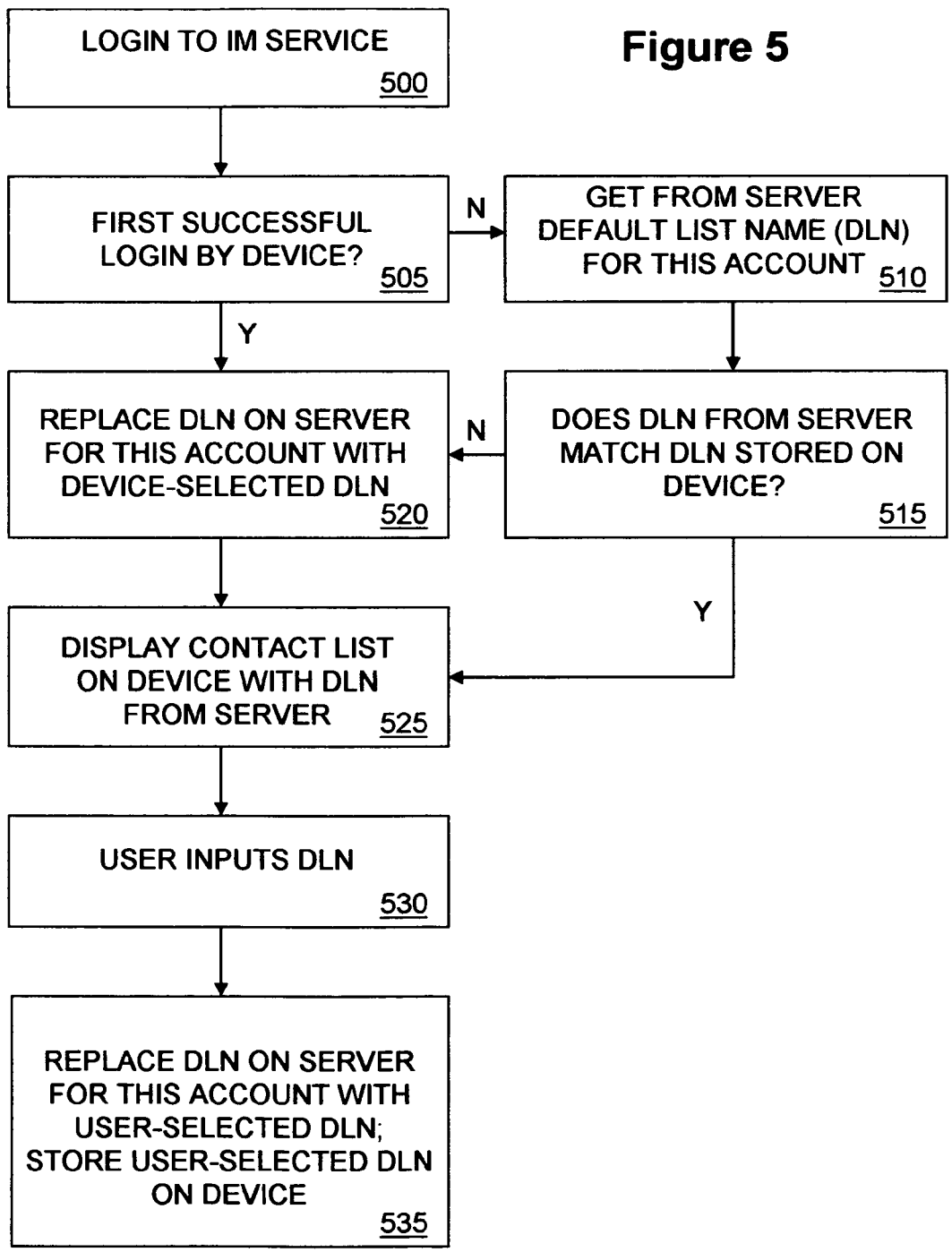
FIG. 5 is a flow diagram of a default list naming method performed by a mobile electronic device.

Turning to FIG. 5, a flow diagram of a default list naming method performed by device 100 in one embodiment of the invention is shown. A user of device 100 requests to login to an IM service facilitated by IM server 250 (500). The login request is initiated through inputs on user interface 330 and includes user credentials. User credentials may be entered on user interface 330 or may originate from other sources, such as a subscriber identity module (SIM) card inserted into device 100. The login request is intercepted by IM client 420, which runs on processor 320. IM client 420 transmits the login request via wireless interface 310 to IM server 250. IM server 250 validates the user credentials and transmits to IM client 420 via wireless interface 310 login success indication. IM client 420 determines whether this is the first successful login to the IM service by device 100 (505). If so, IM client 420 replaces the IM service-selected default contact list display name (hereinafter "DLN") stored on IM server 250 for this user account with a DLN selected by device 100 that is meaningful to the user (520). More particularly, IM client 420 references language setting 430 for a preferred language. IM client 420 then references configured display names 440 and selects the configured DLN that corresponds to the preferred language indicated in language setting 430. IM client 420 then replaces the service-selected DLN stored on IM server 250 for this user account with the device-selected DLN. IM client 420 then receives the default contact list with the DLN from IM server 250 and renders the default contact list on display 130 with the DLN (525). While logged-in to the IM service, the user may thereafter input a user-selected DLN through inputs on user interface 330 (530). If the user elects to do this, IM client 420 replaces the DLN stored on IM server 250 for this user account with the user-selected DLN and the user-selected DLN is added to active display names 450 (535).

If IM client 420 determines at Step 505 that this is not the first successful login to the IM service by device 100, it may or may not be the case that this is the first successful login to this user account. For example, device 100 may be used by multiple users having different SIM cards and user credentials. If it is the first successful login to this user account, it is desirable for IM client 420 to replace the IM service-selected DLN stored on IM server 250 for this user account with a device-selected DLN. On the other hand, if it is not the first successful login to this user account, it is desirable for IM client to avoid replacing any user-selected DLN stored on IM server 250 for this user account. To address this multiple user account scenario, IM client 420 retrieves from IM server 250 the DLN for this user account (510) and determines whether the DLN received from IM server 250 matches any user-selected DLN stored in active display names 450 (515). If there is not a match, IM client 420 replaces the DLN stored on IM server 250 for this account with a device-selected DLN that is meaningful to the user (520). If there is a match, however, IM client 420 proceeds to Step 525 without replacing the DLN stored on IM server 250 for this account.

Figure 6:
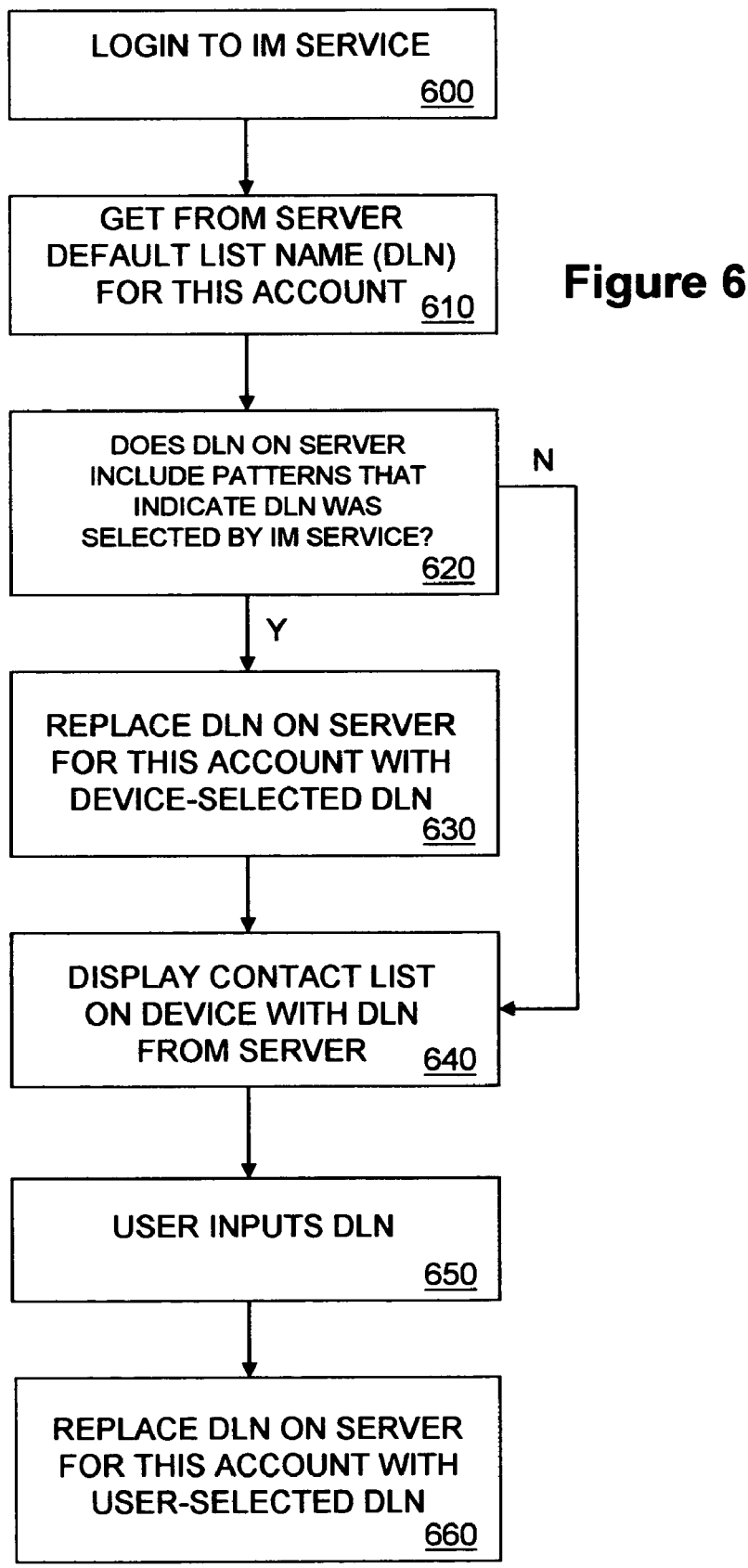
FIG. 6 is a flow diagram of another default list naming method performed by a mobile electronic device.

Turning to FIG. 6, a flow diagram of a default list naming method performed by device 100 in another embodiment of the invention is shown. In this embodiment, IM client 420 includes pattern recognition code for determining whether a DLN stored on IM server 250 is IM service-selected and, consequently, should be replaced with a device-selected DLN. A user of device 100 requests to login to an IM service facilitated by IM server 250 (600). After login validation, IM client 420 retrieves from IM server 250 the DLN for this user account (610) and determines whether the DLN received from IM server 250 includes patterns that indicate the DLN was selected by the IM service (620). For example, IM client 420 may know that the IM service assigns DLNs having ten characters wherein the first seven characters are letters and the last three characters are numbers. If patterns indicating a service-selected DLN are present, IM client 420 replaces the DLN stored on IM server 250 for this user account with a device-selected DLN that is meaningful to the user (630), which is obtained from configured display names 440 using the preferred language indicated in language setting 430. IM client 420 then receives the default contact list with the DLN from IM server 250 and renders the default contact list on display 130 with the DLN (640). If patterns indicating a service-selected DLN are not present, IM client 420 bypasses the replacement step and renders the default contact list on display 130 with the DLN stored on IM server 250. While logged-in to the IM service, the user may thereafter input a user-selected DLN through inputs on user interface 330 (650). If the user elects to do this, IM client 420 replaces the DLN stored on IM server 250 for this user account with the user-selected DLN (660).

Figure 7:
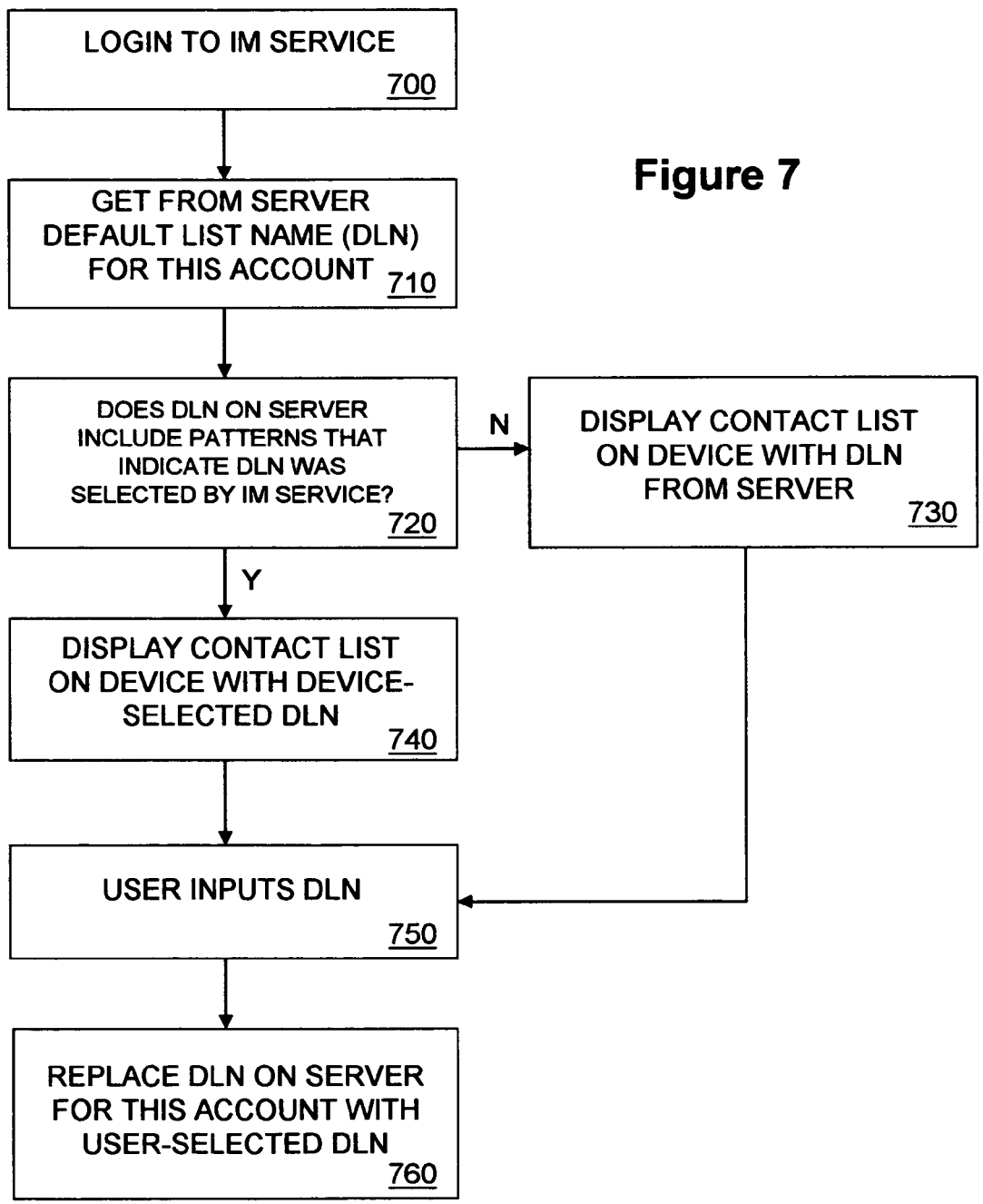
FIG. 7 is a flow diagram of another default list naming method performed by a mobile electronic device.

Turning to FIG. 7, a flow diagram of a default list naming method performed by device 100 in another embodiment of the invention is shown. In this embodiment, IM client 420 includes pattern recognition code for determining whether a DLN stored on IM server 250 is IM service-selected and, consequently, a preferred language DLN should be used as a replacement when rendering the DLN on display 130 without replacing the DLN stored on the IM server 250. A user of device 100 requests to login to an IM service facilitated by IM server 250 (700). After login validation, IM client 420 retrieves from IM server 250 the DLN for this user account (710) and determines whether the DLN received from IM server 250 includes patterns that indicate the DLN was selected by the IM service (720). If so, IM client 420 replaces the IM service-selected DLN with a DLN selected by device 100 that is meaningful to the user. More particularly, IM client 420 references language setting 430 for a preferred language. IM client 420 then references configured display names 440 and selects the configured DLN that corresponds to the preferred language indicated in language setting 430. IM client 420 renders the default contact list on display 130 with the configured DLN (740). Note that in this embodiment, however, the configured DLM does not become stored on IM server 250. If patterns indicating a service-selected DLN are not present, IM client 420 renders the default contact list on display 130 with the DLN stored on IM server 250 (730). While logged-in to the IM service, the user may thereafter input a user-selected DLN through inputs on user interface 330 (750). If the user elects to do this, IM client 420 replaces the DLN stored on IM server 250 for this user account with the user-selected DLN (760).

It will be appreciated by those of ordinary skill in the art that the invention can be embodied in other specific forms without departing from the spirit or essential character hereof. For example, in some embodiments, IM client 420 may know that the IM service assigns a foreign language term as a global DLN. In that event, IM client 420 may have a translation table for translating the foreign language DLN into a home language DLN that is meaningful to the user using the preferred language indicated in language setting 430. For example, device 100 may have a translation table with an entry associating the Spanish term "POR DEFECTO" with the English term "DEFAULT" that may be invoked when the IM service assigns "POR DEFECTO" as the global DLN and the preferred language indicated in language setting 430 is English. The present description is therefore considered in all respects to be illustrative and not restrictive. The scope of the invention is indicated by the appended claims, and all changes that come with in the meaning and range of equivalents thereof are intended to be embraced therein.

What is claimed is:

1. A mobile electronic device, comprising:
   a user interface;
   a wireless interface; and
   a processor communicatively coupled with the user interface and the wireless interface, wherein in response to a login to a server having a contact list conducted via the user interface and the wireless interface and under control of the processor a default contact list display name identifying the contact list and selected by the device is presented on the user interface, wherein prior to presenting on the user interface the default contact list display name selected by the device and under control of the processor the device causes a previous default contact list display name identifying the contact list to be replaced with the default contact list display name selected by the device, wherein the device determines whether to replace the previous default contact list display name with the default contact list display name selected by the device based on a comparison of the previous default contact list display name with one or more default contact list display names previously selected by one or more users, and wherein the default contact list display name selected by the device is a language translated version of the previous default contact list display name.

2. The device of claim 1, wherein under control of the processor the device causes the default contact list display name selected by the device to be stored on the server in place of the previous default contact list display name.

3. The device of claim 2, wherein in response to a name change request received via the user interface and under control of the processor the device causes a default contact list name identifying the contact list and selected by a user to be stored on the server in place of the default contact list display name selected by the device.

4. The device of claim 1, wherein the device determines whether to replace the previous default contact list display name with the default contact list display name selected by the device based on whether the login is a first successful login.

5. The device of claim 1, wherein the device determines whether to replace the previous default contact list display name with the default contact list display name selected by the device based on one or more patterns in the previous default contact list display name.

6. The device of claim 1, wherein the default contact list display name selected by the device is non-derivative of the previous default contact list display name.

7. The device of claim 1, wherein the default contact list display name selected by the device is selected based on a language preference.

8. The device of claim 1, wherein the processor runs instant messaging client software and the server is an instant messaging server.

9. A default contact list naming method for a mobile electronic device, comprising the steps of:

logging-in by the device to a server having a contact list;

determining by the device whether to replace a first default contact list display name identifying the contact list with a second default contact list display name identifying the contact list and selected by the device based on a comparison of the first default contact list display name with one or more default contact list display names previously selected by one or more users, wherein the second default contact list display name is a language translated version of the first default contact list display name; and presenting on a user interface of the device one of the first or second default contact list display names.

10. The method of claim 9, further comprising the step of storing on the server the second default contact list display name in place of the first default contact list display name.

11. The method of claim 10, further comprising the step of, in response to a name change request received on the user interface, storing on the server a third default contact list display name identifying the contact list and selected by the user in place of the second default contact list display name.

12. The method of claim 9, wherein the device determines whether to replace the first default contact list display name with the second default contact list display name based on whether the login is a first successful login.

13. The method of claim 9, wherein the device determines whether to replace the first default contact list display name with the second default contact list display name based on one or more patterns in the first default contact list display name.

14. The method of claim 9, wherein the second default contact list display name is non-derivative of the first default contact list display name.

15. The method of claim 9, wherein the second default contact list display name is selected based on a language preference.

16. The method of claim 9, wherein the device runs instant messaging client software and the server is an instant messaging server.

* * * * *